(12) United States Patent
Aleksov et al.

(10) Patent No.: US 10,475,736 B2
(45) Date of Patent: Nov. 12, 2019

(54) VIA ARCHITECTURE FOR INCREASED DENSITY INTERFACE

(71) Applicant: Intel Corporation, Santa Clara, CA (US)

(72) Inventors: Aleksandar Aleksov, Chandler, AZ (US); Arnab Sarkar, Chandler, AZ (US); Arghya Sain, Chandler, AZ (US); Kristof Darmawikarta, Chandler, AZ (US); Henning Braunisch, Phoenix, AZ (US); Prashant D. Parmar, Gilbert, AZ (US); Sujit Sharan, Chandler, AZ (US); Johanna M. Swan, Scottsdale, AZ (US); Feras Eid, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/718,012

(22) Filed: Sep. 28, 2017

(65) Prior Publication Data

US 2019/0096798 A1 Mar. 28, 2019

(51) Int. Cl.
*H01L 23/50* (2006.01)
*H01L 21/48* (2006.01)
(Continued)

(52) U.S. Cl.
CPC .......... *H01L 23/50* (2013.01); *G06F 17/5068* (2013.01); *G06F 17/5077* (2013.01);
(Continued)

(58) Field of Classification Search
None
See application file for complete search history.

(56) References Cited

U.S. PATENT DOCUMENTS 6,365,504 B1 4/2002 Chien et al.
7,939,445 B1 5/2011 Sutardja et al.
(Continued)

FOREIGN PATENT DOCUMENTS

WO 2017111855 A1 6/2017

OTHER PUBLICATIONS

"ASAP7: A 7-nm finFET Predictive Process Design Kit," Clark, et al., Microelectronics Journal 53 (2016 105-115.
(Continued)

*Primary Examiner* — Long Pham
(74) *Attorney, Agent, or Firm* — Patent Capital Group

(57) ABSTRACT

Aspects of the embodiments are directed to an IC chip that includes a substrate comprising a first metal layer, a second metal layer, and a ground plane residing on the first metal layer. The second metal layer can include a first signal trace, the first signal trace electrically coupled to a first signal pad residing in the first metal layer by a first signal via. The second metal layer can include a second signal trace, the second signal trace electrically coupled to a second signal pad residing in the first metal layer by a second signal via. The substrate can also include a ground trace residing in the second metal layer between the first signal trace and the second signal trace, the ground trace electrically coupled to the ground plane by a ground via. The vias coupled to the traces can include self-aligned or zero-misaligned vias.

24 Claims, 9 Drawing Sheets

(51) Int. Cl.
*H01L 23/498* (2006.01)
*G06F 17/50* (2006.01)
*H01L 23/522* (2006.01)
*H01L 23/528* (2006.01)
*H01L 23/00* (2006.01)

(52) U.S. Cl.
CPC ........ *H01L 21/486* (2013.01); *H01L 21/4853* (2013.01); *H01L 23/49816* (2013.01); *H01L 23/49827* (2013.01); *H01L 23/49838* (2013.01); *H01L 23/49866* (2013.01); *H01L 23/5225* (2013.01); *H01L 23/5226* (2013.01); *H01L 23/5286* (2013.01); *G06F 2217/40* (2013.01); *H01L 24/05* (2013.01); *H01L 24/13* (2013.01); *H01L 24/16* (2013.01); *H01L 2224/0401* (2013.01); *H01L 2224/05083* (2013.01); *H01L 2224/05144* (2013.01); *H01L 2224/05147* (2013.01); *H01L 2224/05164* (2013.01); *H01L 2224/131* (2013.01); *H01L 2224/13022* (2013.01); *H01L 2224/16145* (2013.01); *H01L 2924/1434* (2013.01); *H01L 2924/15311* (2013.01); *H01L 2924/3011* (2013.01)

(56) References Cited

U.S. PATENT DOCUMENTS

| | | | |
|---|---|---|---|
| 7,994,631 | B1 | 8/2011 | Zhang |
| 8,852,851 | B2 | 10/2014 | Zhou et al. |
| 9,041,217 | B1 | 5/2015 | Bristol et al. |
| 9,437,569 | B2 | 9/2016 | Teh et al. |
| 9,713,264 | B2 | 7/2017 | Rawlings et al. |
| 2005/0098886 | A1 | 5/2005 | Pendse |
| 2006/0017161 | A1 | 1/2006 | Chung et al. |
| 2008/0048318 | A1 | 2/2008 | Sakurabayashi |
| 2009/0166888 | A1 | 7/2009 | Pozder et al. |
| 2009/0200683 | A1 | 8/2009 | Colburn et al. |
| 2010/0112496 | A1 | 5/2010 | Nakajima et al. |
| 2012/0037414 | A1* | 2/2012 | Tanaka ................. H05K 1/162 174/260 |
| 2012/0302057 | A1 | 11/2012 | Arnold et al. |
| 2012/0313251 | A1 | 12/2012 | Kato |
| 2013/0175077 | A1 | 7/2013 | Kim et al. |
| 2014/0071646 | A1 | 3/2014 | Qian et al. |
| 2014/0124877 | A1 | 5/2014 | Sun et al. |
| 2016/0183370 | A1* | 6/2016 | Rawlings ............. H05K 3/0082 174/257 |
| 2016/0190009 | A1 | 6/2016 | Wallace et al. |

OTHER PUBLICATIONS

Extended European Search Report in European Application No. 18190102.6 dated Feb. 22, 2019, 9 pages.

* cited by examiner

VIA ARCHITECTURE FOR INCREASED DENSITY INTERFACE

BACKGROUND

Packaging sizing for semiconductor products can contribute to overall device scale. For mobile devices, packaging size can facilitate an overall form factor reduction. Packaging size can limit product performance due to restrictions in board layout and density.

Figure 1A:
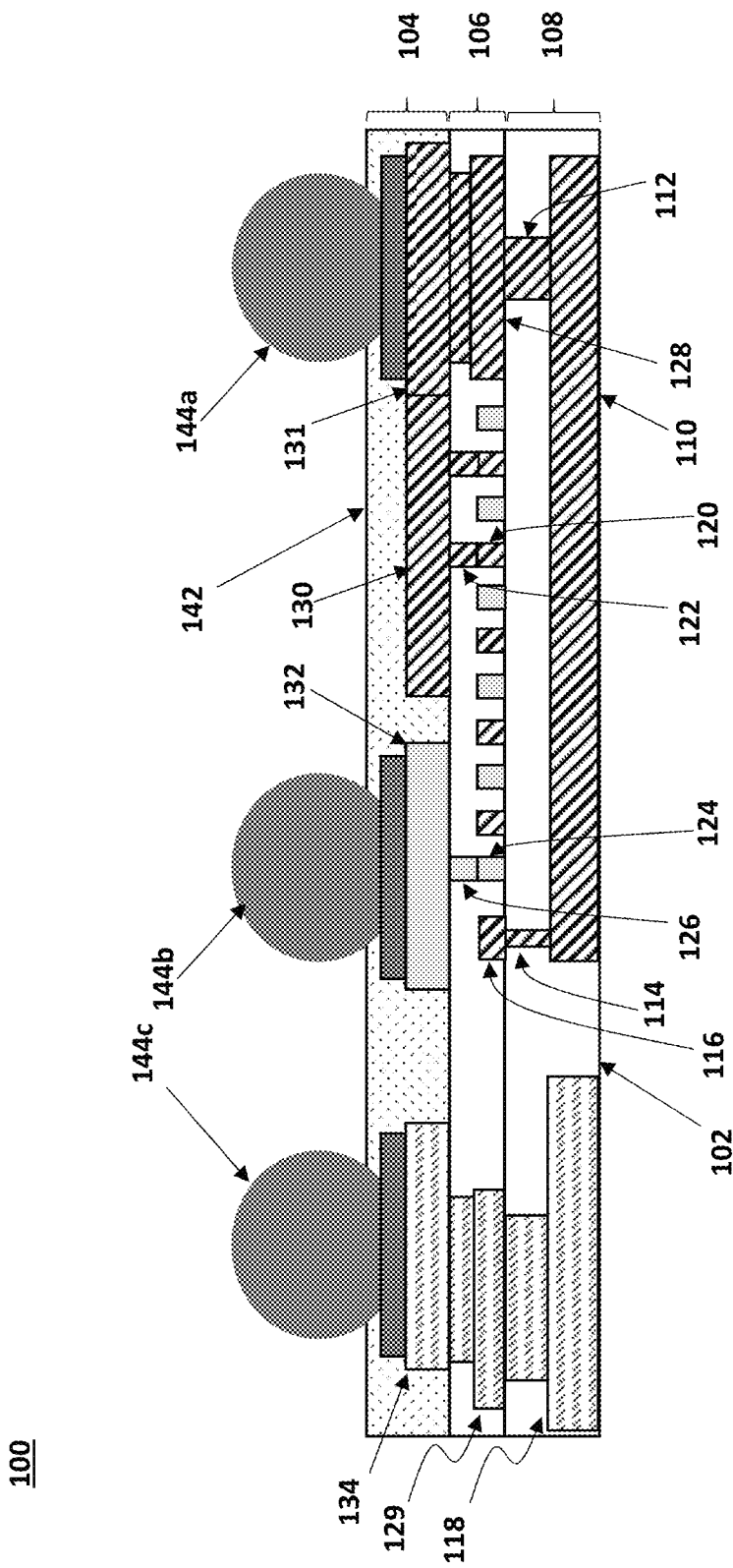
FIG. 1A is a schematic diagram of a cross-sectional view of a package substrate that includes a via architecture in accordance with some embodiments of the present disclosure.

Figures may not be drawn to scale.

DETAILED DESCRIPTION

Described herein are via configurations with surface ground plane designs for increasing routing trace densities. In the following description, various aspects of the illustrative implementations will be described using terms commonly employed by those skilled in the art to convey the substance of their work to others skilled in the art. However, it will be apparent to those skilled in the art that the present disclosure may be practiced with some of the described aspects. For purposes of explanation, specific numbers, materials and configurations are set forth in order to provide a thorough understanding of the illustrative implementations. However, it will be apparent to one skilled in the art that the present disclosure may be practiced without the specific details. In other instances, well-known features are omitted or simplified in order not to obscure the illustrative implementations.

Various operations will be described as multiple discrete operations, in turn, in a manner that is most helpful in understanding the present disclosure, however, the order of description should not be construed to imply that these operations are necessarily order dependent. In particular, these operations need not be performed in the order of presentation.

The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. By contrast, a first layer "on" a second layer is in direct contact with that second layer. Similarly, unless explicitly stated otherwise, one feature disposed between two features may be in direct contact with the adjacent features or may have one or more intervening layers.

Package z-height is a differentiator for today's semiconductor products, especially in the mobile arena. Two of the limiting factors for z-height reduction include power delivery and input/output (I/O) routing.

This disclosure describes an architecture for the top package substrate layers that include a via configuration that can increase I/O routing density that can lead to z-height reduction due to layer count reduction and/or layer thickness reduction by using self-aligned vias (SAVs) or zero-misaligned vias (ZMVs) and a patterned top metal layer. The use of lithographically defined SAVs or ZMVs and the use of a closely spaced ground plane allows for single ended or differential pair high speed I/Os to be routed in a single metal layer instead of across multiple metal layers. The via configuration facilitates a 1:1 ground-to-signal trace ratio in the routing layer. This via configuration allows for a wide range of impedances to be closely matched. For example, by increasing the distance to the top ground (GND) plane, impedance can be changed, while changing the thickness distance to the bottom GND changes the impedance less-so. The via configuration described herein also decreases crosstalk between neighboring signal traces.

FIG. 1A is a schematic diagram of a cross-sectional view of a package substrate 100 that includes a via architecture in accordance with embodiments of the present disclosure. The package substrate 100 includes a substrate 102. The package substrate can include a plurality of metallization interconnect layers for integrated circuits. A package substrate may include alternating metal and dielectric layers. Among the metal layers, some may form ground or power planes and others may be used for signal traces.

The substrate 102 includes metallization interconnect layers for integrated circuits. Based on aspects of the present disclosure, the number of metal layers can be reduced (e.g., by a metal layer pair, such as a top and bottom metal layer). In FIG. 1A, the substrate 102 includes three metal layers: M1 104, M2 106, and M3 108, each separated by a dielectric layer. In at least some embodiments, the substrate 102 includes interconnects, for example, vias, configured to connect the metallization layers M1 104, M2 106, and M3 108.

The M3 metal layer 108 is typically formed first. Here, the M3 metal layer generally includes a M3 ground plane 110. The M3 ground plane 110 can be interconnected to upper layers by a via 112. The M3 metal layer 108 also includes power routing lines 118 and corresponding vias. The M3 ground plane 110 can also be coupled to the M2 metal layer 106 by a ground via 114. In the M2 metal layer, a ground pad 116 can electrically couple the M2 ground traces (e.g., ground trace 120) to the M3 ground plane 110.

The M2 metal layer 106 generally includes the high speed input/output signal traces (e.g., signal trace 124) and the ground traces (e.g., ground trace 120). The signal trace 124 is electrically coupled to the M1 signal pad 132 by a SAV or ZMV 126. Likewise, the ground trace 120 can be electrically coupled to the M1 metal layer ground plane 130 by a SAV or ZMV 122. The M2 metal layer also includes other vias and interconnects, such as the M2 ground landing pad 128 and the M2 power landing pad 129.

The top metal layer or M1 metal layer 104 can include first level interconnect (FLI) pads, such as the signal pad 132 and the power interconnect pad 134. The M1 metal layer 104 can also include a surface metal that can serve as an M1 ground plane 130. Solder bumps 144a-144c can be used to interconnect the various circuit elements to other chips. The M1 metal layer 104 can also include a solder resist 142.

The M1 metal layer 104 is coupled to the M2 metal layer 106 by SAV or ZMV coupled to traces in the M2 metal layer 106. The SAV or ZMV 126 connects the signal trace 124 to signal bump 144b. The ground trace 120 is coupled to the M1 ground plane 130 by an SAV or ZMV 291122. Certain ground traces in the M2 metal layer 106 can be coupled to the ground pad 116 in the M2 metal layer 106. These ground traces would be coupled to the M1 metal layer ground plane 130 by the M3 ground plane 110. The M1 metal layer ground plane 130 is connected to ground bump 144a on the die as well as to the M3 ground plane 110 in the substrate. This helps adjust impedance, tie all ground lines to the same potential, reduce cross talk, and enable the high speed input/output (HSIO) SAV/ZMV I/O to reach optimum performance.

Figure 1B:
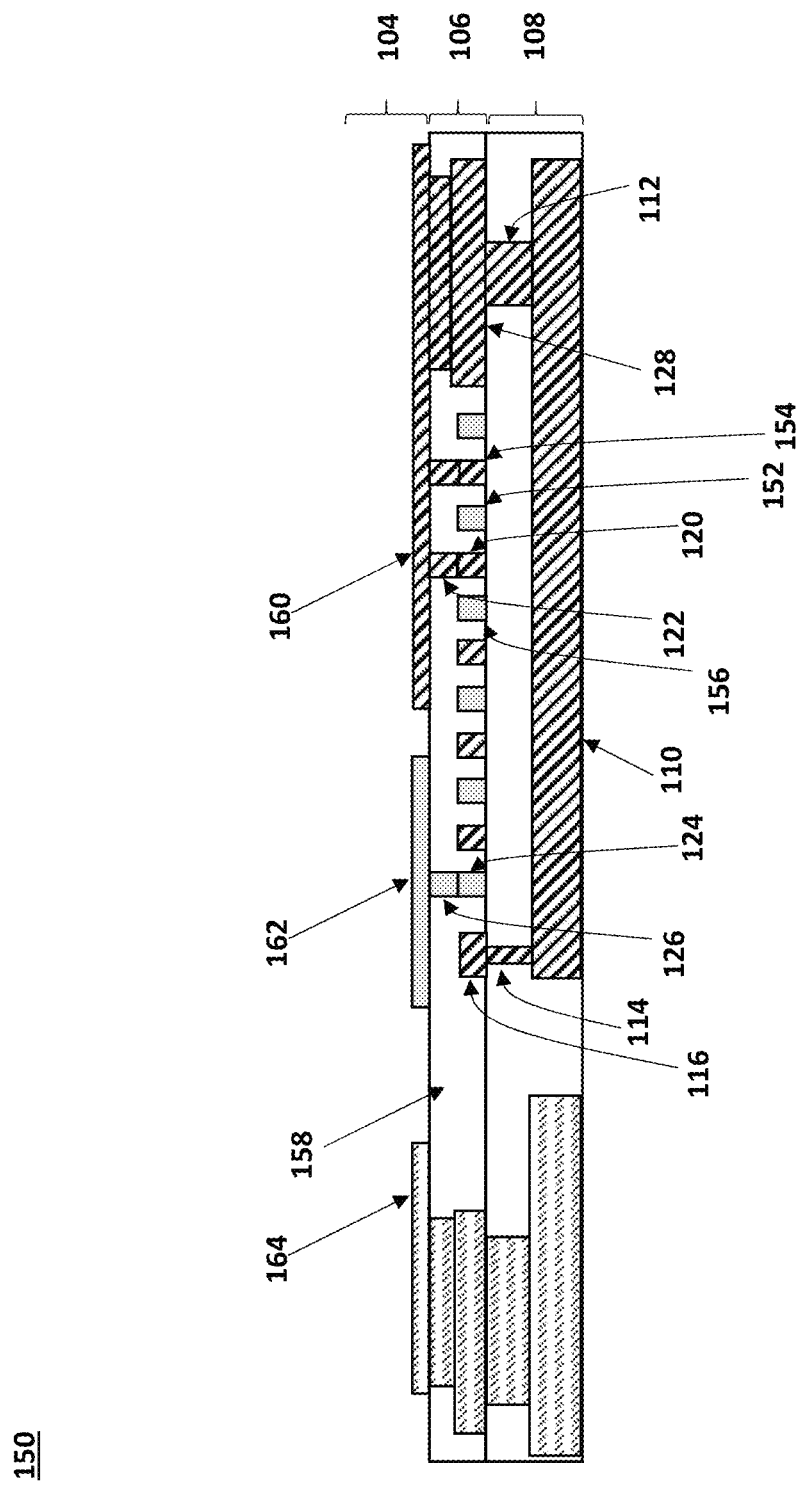
FIG. 1B is a schematic diagram of a cross-sectional view of another example package substrate that includes a via architecture in accordance with some embodiments of the present disclosure.

FIG. 1B is a schematic diagram of a cross-sectional view of another example package substrate 150 that includes a via architecture in accordance with embodiments of the present disclosure. The via architecture of package substrate 150 is similar to that shown in FIG. 1A. The surface metal of the M1 ground plane 130 in the embodiments illustrated by FIG. 1A can be a standard thickness metal layer (which is usually 10-15 μm thick). However, if such metal thickness is not required (for instance all I/Os, whether high speed or low speed, can be routed on M2) the top metal can serve only as first level interconnect (FLI) pads. For example, pad 162 can serve as a signal pad, while pad 164 can serve as a power pad. The M1 ground plane 160 can replace the thicker M1 metal layer ground plane 130 shown in FIG. 1A. The FLI pads can be made as thin as possible considering FLI requirement. To facilitate signaling, a copper thickness of only 1.5 μm is sufficient as an effective ground plane. To have a stable FLI, this copper (Cu) layer can be followed by a barrier layer of nickel (Ni) and then palladium (Pd) and gold (Au) (thin layers). The total thickness can be at or below 5 μm, which can further reduce the package thickness.

The thin metal layer for the M1 ground plane 160 on top has a thickness between 2-6 μm and can be formed from copper. Other metals typical for a surface finish can also be used depending on the application.

The SAV and ZMV do not need a large pad to land, so the density of the traces can be increased and can be formed on a single metal layer (e.g., M2 106). Because the traces are on a single metal layer, ground traces can be formed between each signal trace (except for differential pairs). For example, ground trace 120 resides between signal trace 156 and signal trace 152. Signal trace 152 resides between ground traces 120 and 154. To provide grounding, the ground traces can be connected to the top/surface ground layer (e.g., M1 metal layer ground plane 130) and by a ground plane below (e.g., M3 ground plane 110).

In general, the via architecture described herein lowers the z-height of the package substrate and reduces near-end and far-end cross talk. Due to the use of SAV or ZMV, a higher I/O density can be achieved with the goal of routing all critical HSIO lines in a single layer. This is achieved without changing design rules, such as by using new or advanced patterning equipment.

One of the constraints of an increase of the number of I/O lines in a single metal layer is that crosstalk can be increased as signaling lines get closer together. The increased line density of the via architecture described herein allows for the placement of ground lines on both sides of every signal line and ground lines on both sides of differential pair lines, satisfying impedance targets and improving far- and near-end crosstalk.

To meet the impedance requirements and improve signaling, the ground lines should have the same potential. Since there is no alignment margin for downward vias (that are not SAV or ZMV), the thin metal layer/surface finish of the M1 ground plane 160 used for FLI attach is used to connect all ground lines. The ground connectivity is completed by vias going down to the package substrate GND layers (e.g., through M3 ground plane 110) wherever alignment margin allows it. This is what is illustrated by the ground pad 116 and corresponding ground via 114 in FIG. 1A-1B.

Electrical signals, such as power and/or input/output (I/O) signals, may be routed to and/or from devices through the one or more metal (interconnect) layers. The one or more interconnect layers M1 104, M2 106, and M3 108 may form a metallization stack (also referred to as an "interlayer dielectric stack") of the package substrate.

The routing traces (e.g., signal trace 124 and ground trace 120) may be arranged within the M2 metal layer 106 to route electrical signals according to a wide variety of designs. In some embodiments, the routing traces may include traces filled with an electrically conductive material such as a metal.

The interconnect layers may include a dielectric material disposed between the interconnect structures. For example, the M2 metal layer 106 can include a dielectric material 158 between the traces and other M2 metal layer structures. In some embodiments, the dielectric material 158 disposed between the interconnect structures in different ones of the interconnect layers M1 104, M2 106, and M3 108 may have different compositions; in other embodiments, the composition of the dielectric material 158 between different interconnect layers M1 104, M2 106, and M3 108 may be the same.

The package substrate 100 may include a solder resist material 142 (e.g., polyimide or similar material) and one or more conductive contacts 131, 132, and 134 formed on the M1 metal layer 104. In FIG. 1A, the conductive contacts 131, 132, and 134 are illustrated as taking the form of bond pads. The conductive contact 132 may be electrically coupled with the SAV/ZMV 126 and configured to route the electrical signals using signal trace 124 in the M2 metal layer 106. Likewise, conductive contact 131 may be electrically coupled with the SAV/ZMV 122 and configured to be a ground line routed by ground trace 120.

Solder bump 144a may be formed on the ground conductive contacts 131 to mechanically and/or electrically couple a package including the package substrate 100 with another component (e.g., a circuit board). The package substrate 100 may include additional or alternate structures to route the electrical signals from the metal layers 104-108; for example, the conductive contacts may include other analogous features (e.g., posts) that route the electrical signals to external components.

Figure 2:
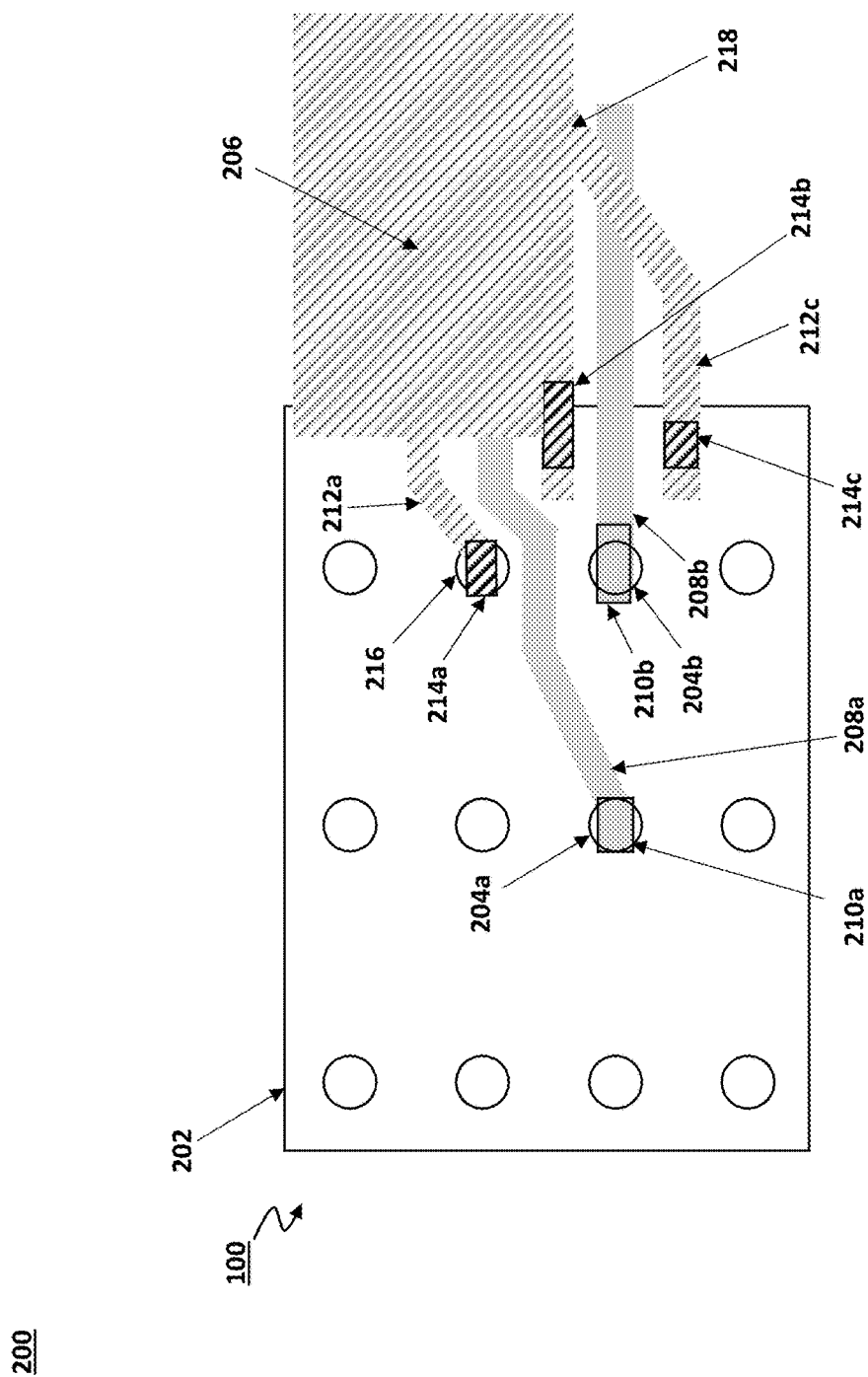
FIG. 2 is a schematic diagram of top view of a package substrate that includes a via architecture and a ground plane in accordance with some embodiments of the present disclosure.

FIG. 2 is a schematic diagram of top view 200 of a package substrate 100 that includes a via architecture and a ground plane in accordance with embodiments of the present disclosure. FIG. 2 illustrates a package substrate 202 that includes a bump field that includes solder bump landing pads (e.g., signal pads 204a-b, and ground pad 216). The M1 ground plane 206 is illustrated. The ground traces and signal are also illustrated, though it is understood that the ground traces are in the M2 metal layer and are shown for illustrative purposes. The SAV and ZMV are also illustrated, and likewise, it is understood that the SAV and ZMV are in the M2 metal layer.

For example, FIG. 2 illustrates a signal trace 208a routed to solder bump signal pad 204a and connected by a SAV/ZMV 210a, signal trace 208b routed to solder bump 204b and connected by a SAV/ZMV 210b. The signal traces are in the M2 metal layer and are presented for illustrative purposes.

FIG. 2 also illustrates a ground trace between each signal trace. For example, signal trace 208a is adjacent to ground traces coupled to ground SAV/ZMV 214a and SAV/ZMV 214b. Signal trace 208a is shown to wind between the adjacent ground traces to reach the signal pad 204a. The ground traces may extend as far as they can before termination.

FIG. 2 also illustrates the ground trace routing. A ground pad 216 can be electrically connected to the M1 ground plane 206. The ground pad 216 can be connected to the M2 ground trace by a ground SAV/ZMV 214a (the ground trace is not shown). The M1 ground plane 206 can be patterned to connect to the ground pad 216. FIG. 2 shows an M1 patterned ground line 212a coupling the grounding pad 216 to the M1 ground plane 206. FIG. 2 illustrates how the M1 ground plane can be patterned to accommodate the increased density of signal lines. Another example is shown as ground SAV/ZMV 214c, which couples to the M1 ground plane 206 by a patterned M1 metal line 212c and couples to the M1 ground plane 206 at a location 218. The signal trace 208b is in a lower layer (e.g., M2 layer) than the patterned M1 metal line 212c, highlighting the ability to couple M2 layer ground traces to a common ground using the SAV/ZMV configuration.

FIGS. 3-6 illustrate various embodiments for the M1 metal layer ground plane configuration. Each embodiment facilitates a decrease in near-end and far-end crosstalk. It is understood that FIGS. 3-6 illustrate example configurations, and are not limiting. Other ground plane configurations can also be used to achieve similar results. FIGS. 3-6 further illustrate how the signal traces are adjacent to ground traces, with the exception of differential pair traces, which are two signal traces adjacent to a ground trace (shown in FIG. 6).

Figure 3:
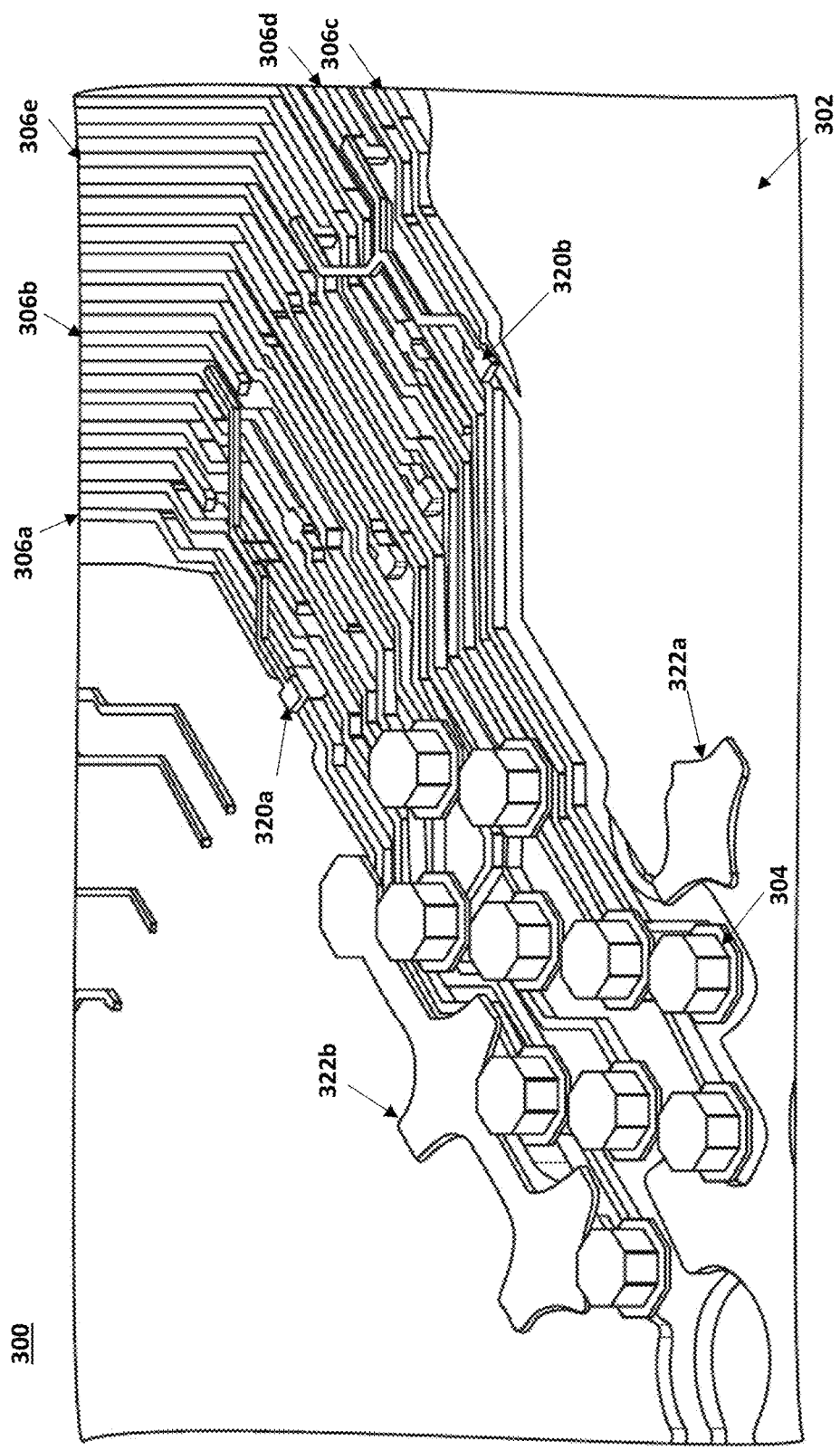
FIG. 3 is a schematic diagram of a perspective cutaway view of an example package substrate in accordance with some embodiments of the present disclosure.

FIG. 3 is a schematic diagram of a perspective cutaway view of an example package substrate 300 in accordance with embodiments of the present disclosure. Package substrate 300 includes small patches of metal on the surface 302 that are connected to the ground traces with SAV/ZMV. The surface metal configuration of FIG. 3 uses minimal surface finish to tie the ground traces on the routing layer (M2 metal layer) to the main ground structure and to the ground bump 304.

For example, a patterned ground line 320a can electrically couple ground trace 306a with ground trace 306b. Likewise, patterned ground line 320b can electrically couple ground trace 306c with ground traces 306d and 306e. Surface ground plane patches 322a and 322b can be coupled with an M3 ground plane (not shown) by a via.

Figure 4:
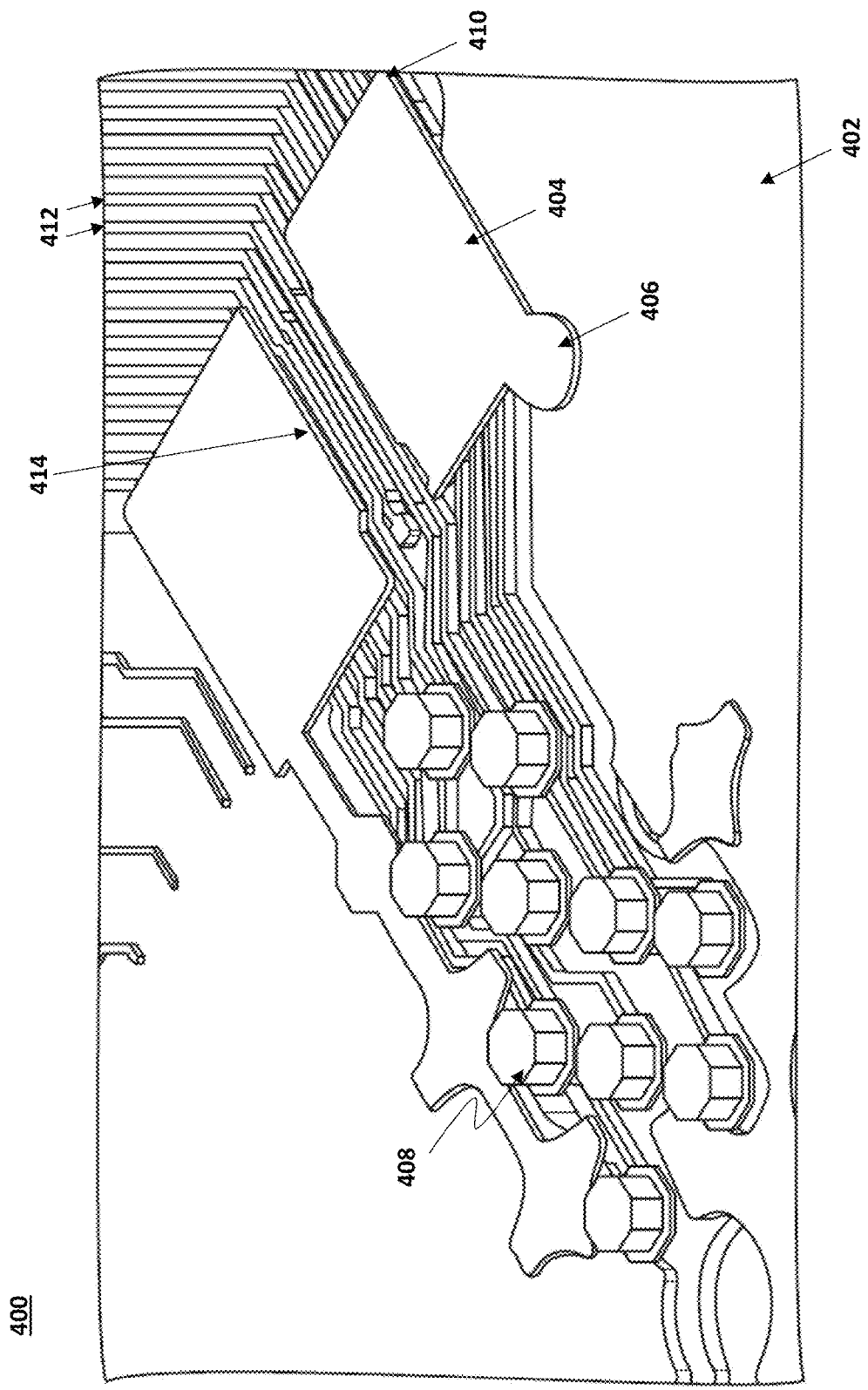
FIG. 4 is a schematic diagram of a perspective cutaway view of another example package substrate in accordance with some embodiments of the present disclosure.

FIG. 4 is a schematic diagram of a perspective cutaway view of another example package substrate 400 in accordance with embodiments of the present disclosure. The surface ground plane 404 resides on the package surface 402 and extends from the location of die-level ground bump field 408 to the edge of the die 410. This surface ground plane 404 also has a slot 414 (i.e. opening) over differential pair signal lines 412. The surface ground plane 404 also includes a pad 406 for connecting the surface ground plane 404 to the M3 metal ground plane (not shown).

Figure 5:
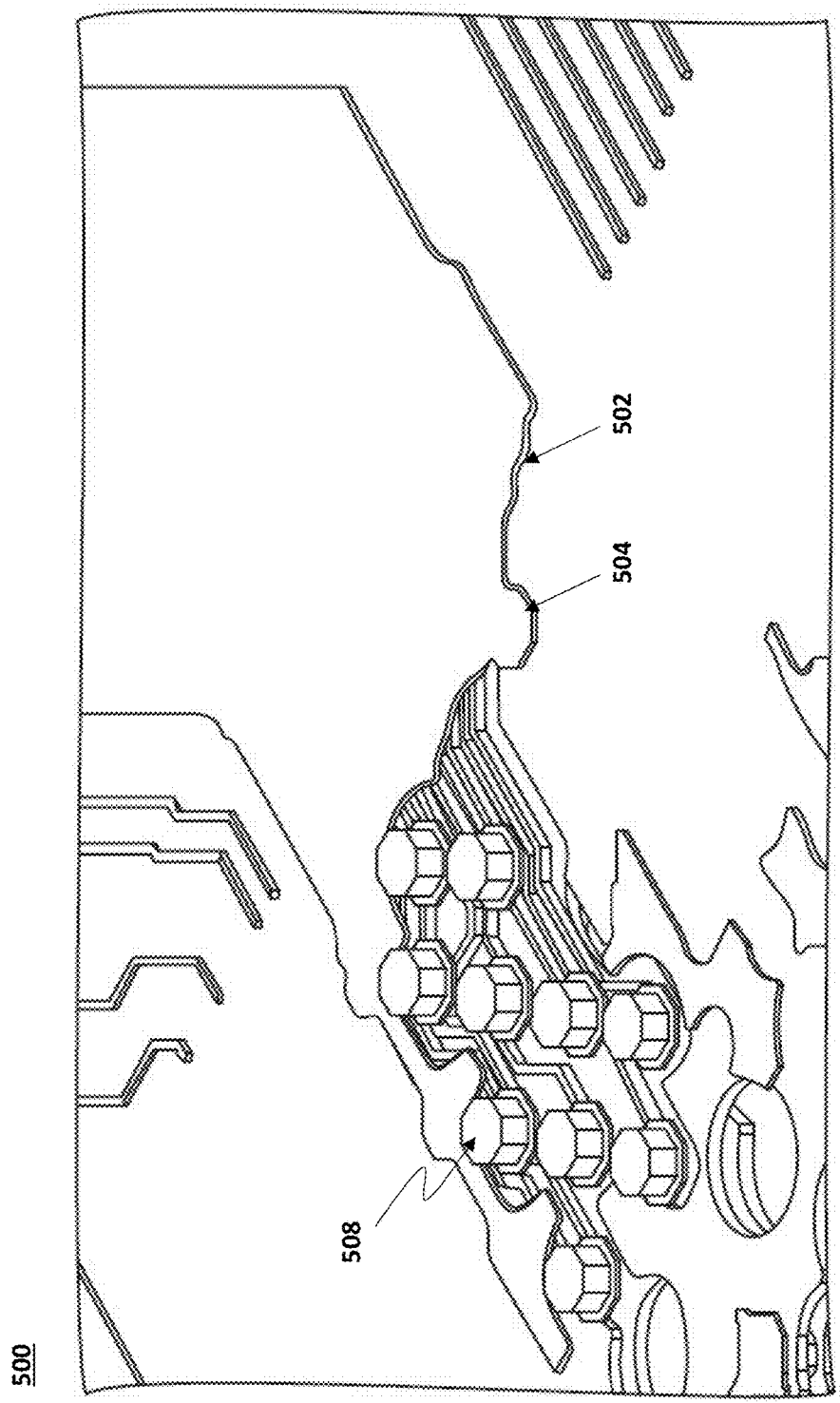
FIG. 5 is a schematic diagram of a perspective cutaway view of another example package substrate in accordance with some embodiments of the present disclosure.

FIG. 5 is a schematic diagram of a perspective cutaway view of another example package substrate 500 in accordance with embodiments of the present disclosure. The package substrate 500 is similar to the package substrate 400. The package substrate 500 includes a larger surface ground plane 502 that does not include a slot for differential pair traces. The surface ground plane 502 extends from the bump field 508 for the entire length of the traces to the location where the single traces via down to the second layer interconnect field. The surface ground plane 502 also includes a pad 504 for connecting the surface ground plane 502 to the M3 metal ground plane (not shown).

Figure 6:
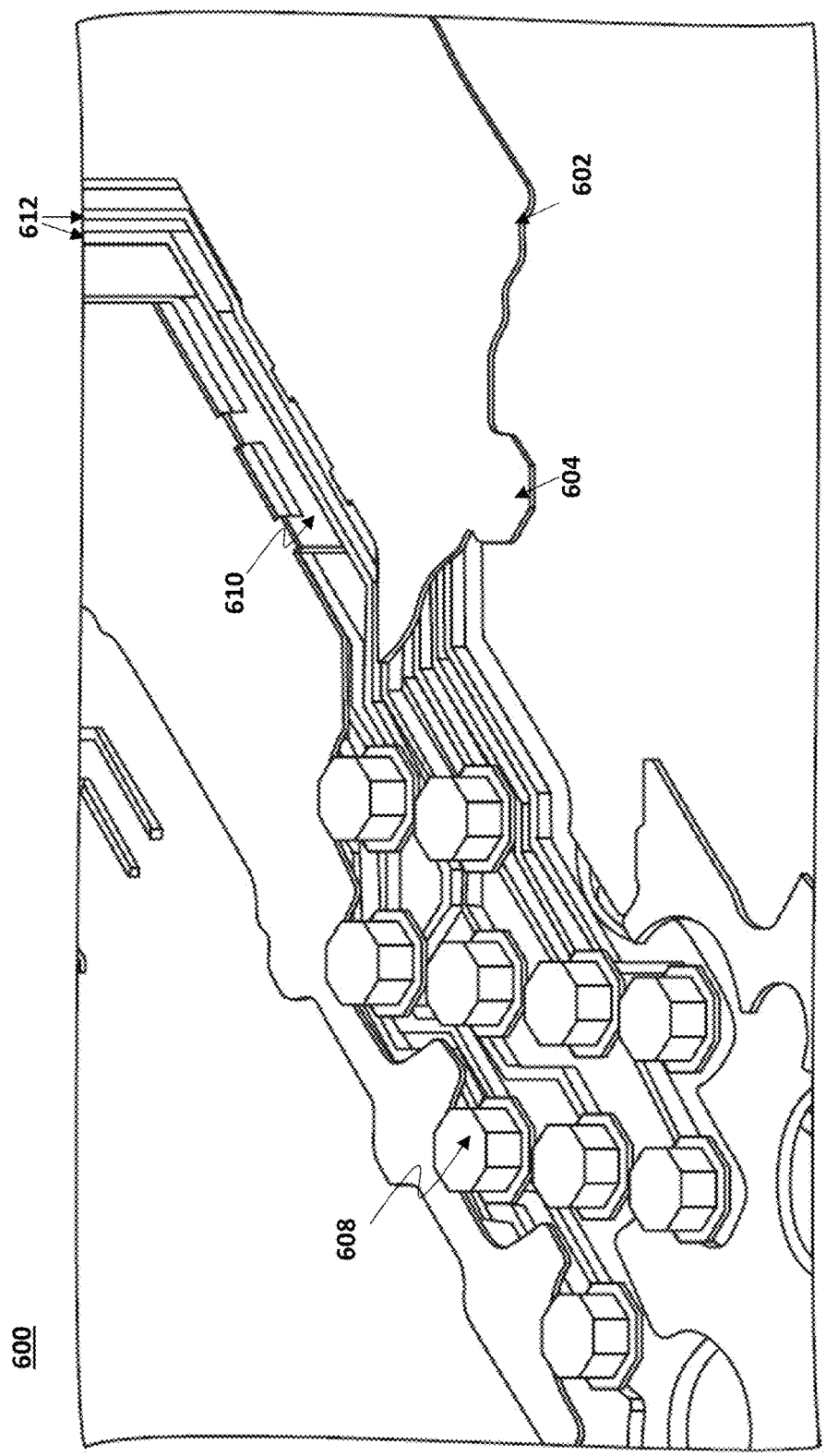
FIG. 6 is a schematic diagram of a perspective cutaway view of another example package substrate in accordance with some embodiments of the present disclosure.

FIG. 6 is a schematic diagram of a perspective cutaway view of another example package substrate 600 in accordance with embodiments of the present disclosure. Package substrate 600 can be considered as a combination of the surface ground plane configuration illustrated in FIGS. 4 and 5. The surface ground plane 602 extends from the bump field 608 to the end of the routing. The surface ground plane 602 includes a slot 610 over differential pair signal traces 612. The surface ground plane 602 also includes a pad 604 for connecting the surface ground plane 602 to the M3 metal ground plane (not shown).

Figure 7:
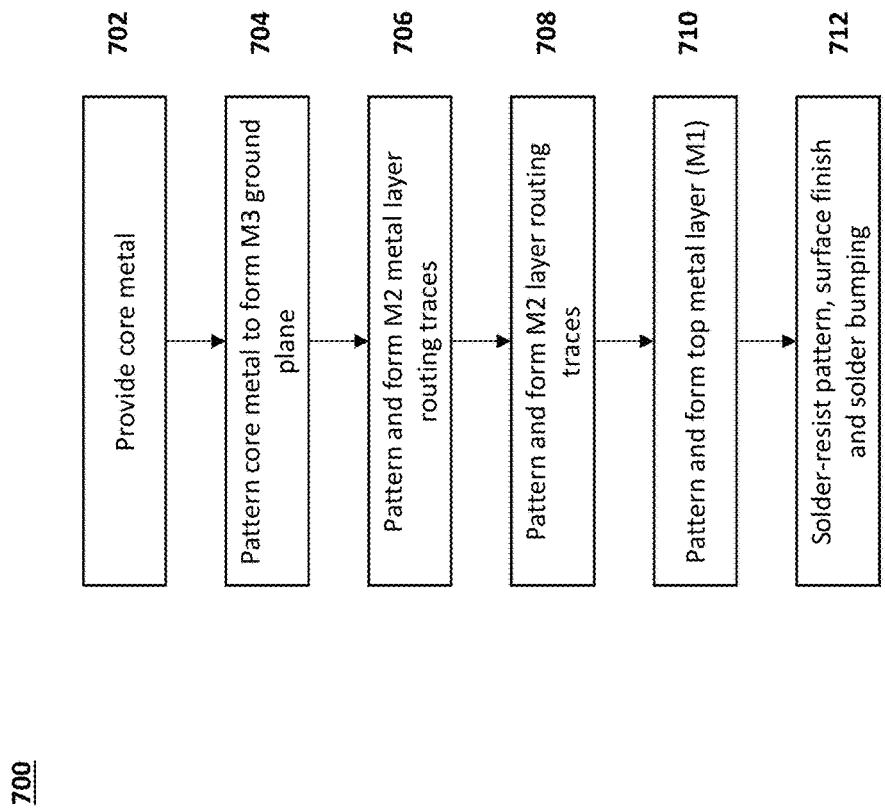
FIG. 7 is a process flow diagram for forming a package substrate that includes self-aligned or zero-misaligned vias and a top metal layer in accordance with some embodiments of the present disclosure.

FIG. 7 is a process flow diagram 700 for forming a package substrate that includes self-aligned or ZMVs and a top metal layer in accordance with embodiments of the present disclosure. A core metal material can be provided (702). The core metal material can be patterned to form the M3 metal layer structures, such as the M3 ground plane (704). The core metal material can be further processed to form the M2 metal layer structures. For example, the M2 metal layer routing traces can be patterned and formed (706). The M2 metal layer SAVs and/or ZMVs can be patterned and formed (708). The formation of SAV and ZMV can be performed by known techniques, as can the patterning and formation of the routing traces. The formation of SAV or ZMV can result in a via that has a width that is substantially similar to a width of the connected trace. The length of the SAV or ZMV can be changed to suit the connections and trace routing. The z-height of the via can be controlled based on a desired overall z-height of the M2 metal layer and/or the overall package z-height.

By way of an example, a zero-misaligned via (ZMV) formation process can use a dual-tone photoresist that includes two layers of a photomask. The photomask is rigid and substantially planar, and can be formed using known techniques that are more precise than standard via-pad registration techniques. Therefore, via-pad misalignment can be small, which allows the size of the pad to be reduced to a size the same as, or similar to, the size of the via. In some example cases, the use of a ZMV can facilitate an I/O connection density of greater than 20 I/O/mm/layer, such as between 50-80 I/O/mm/layer and above, including as many as 100-250 I/O/mm/layer.

Similarly, a mask can be used to form self-aligned vias (SAVs). Self-aligned vias can be formed using known techniques. For example, an SAV can be created by forming an Mx+1 layer over the Mx layer traces (and insulating layer(s)). The Mx+1 layer can be patterned using a hardmask or via mask to form a trench exposing the Mx metal layer trace. The SAV metal (e.g., copper) can be deposited within the trench on the trace using known metal deposition techniques. The resulting via (i.e., SAV) can have the same or similar width as the underlying trace. The length and height of the SAV can be controlled based on implementation choices.

The M1 metal layer (e.g., M1 ground plane) can be patterned and formed (710). The patterning and formation of the top metal layer M1 can be achieved using substrate semi-additive manufacturing (including seed layer deposition, lithography, plating, resist removal, and seed layer etch), or using subtractive or additive processing approaches. One advantage of additive manufacturing may be that the process flow is simplified by combining the deposition and patterning into one step, instead of requiring the multiple steps used in conventional semi-additive manufacturing. Thus, the M1 metal layer ground plane with patches and slots can be created in a single step.

Some examples of additive processing include:

1. Cold spray, in which powders of the conductive material to be deposited are accelerated through a nozzle at high speeds, forming a mechanical bond upon impact with the substrate surface. Patterning can be achieved by controlling the nozzle dimensions and movement, and/or by spraying the powders through a shadow mask with fine features. This approach is likely to produce high conductivity films due to the absence of organic binders or solvent, and the ability to keep the substrate at room temperature during spraying, thus reducing oxidation.

2. Inkjet printing in which conductive inks are printed (e.g., using an aerosol jet printer) directly on the substrate and subsequently cured or sintered to remove the solvent. This approach is likely to produce very thin films and small feature sizes (e.g., ~12 um line width has been demonstrated using an aerosol jet printer).

3. Stencil printing of a conductive paste.

4. Laser assisted selective electroless plating, in which the regions to be patterned with the conductive layer are first functionalized using self-assembled monolayers and laser exposure, followed by electroless plating which only occurs in the functionalized areas.

The package substrate can then undergo solder resist patterning, surface finishing, and solder bump formation (712).

The use of zero-misalignment via-pad structures or self-aligned via-pad structures, as described herein, substantially decreases the via and pad sizes while increasing achievable density such as input/output connections/mm/layer. Aspects of the present embodiments have advantages, such as a decrease in manufacturing costs, a decrease in z-height, and increased electrical performance for off-package I/O connections. Embodiments to provide self-aligned or zero-misaligned via-pad structures as described herein advantageously enable 2.5D packaging (e.g., co-packaging at least two of a central processing unit (CPU), a memory, and a graphics processing unit (GPU); die splitting; quasi-monolithic integration; and other 2.5D packaging techniques). Embodiments can facilitate a reduction in manufacturing cost, decreased package z-height, increased electrical performance, and increased scalability.

Figure 8:
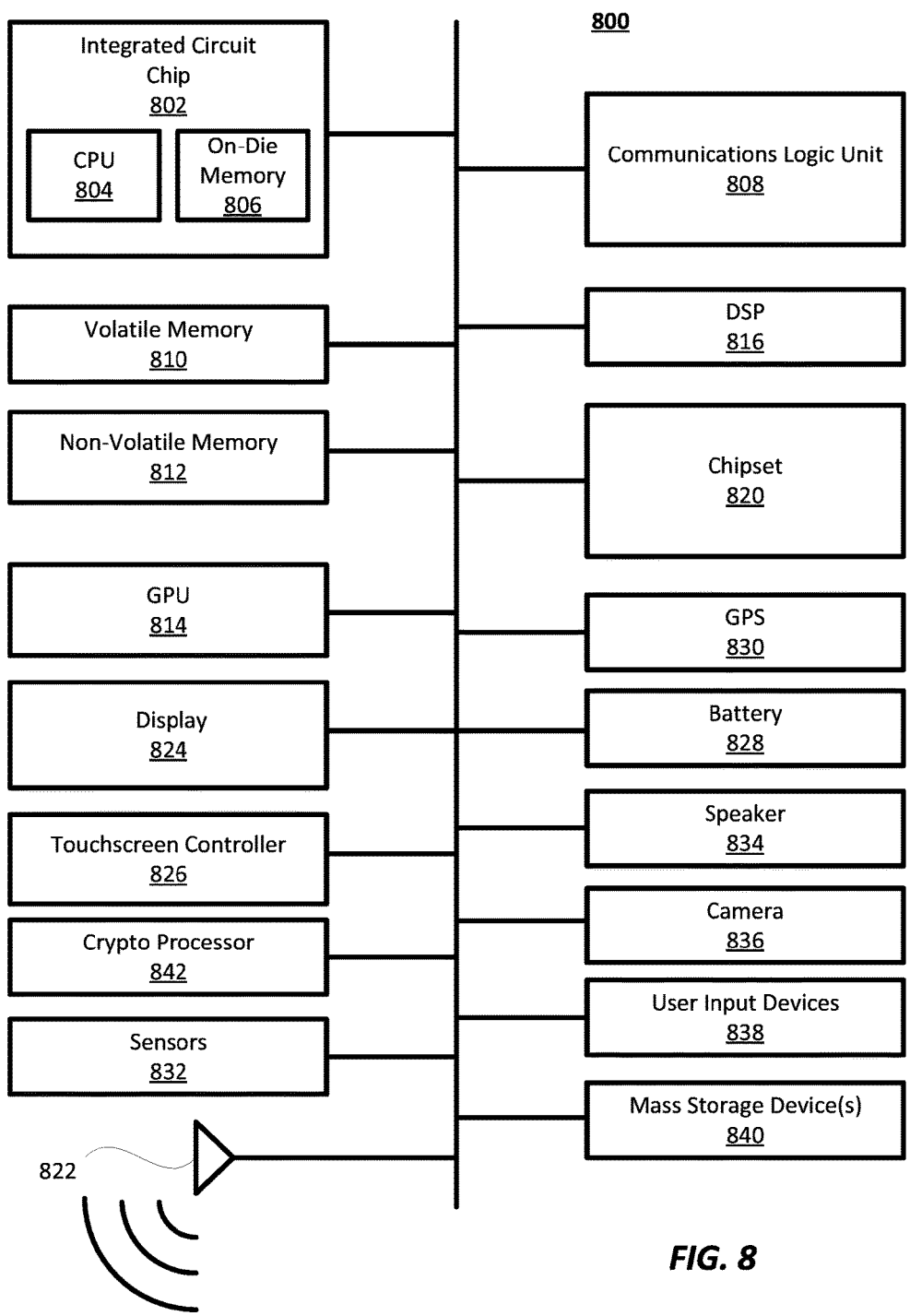
FIG. 8 is a schematic diagram of a computing device in accordance with some embodiments of the present disclosure.

FIG. 8 is a schematic diagram of a computing device in accordance with embodiments of the present disclosure. The computing device 800 can include a processor, as well as a memory and communications circuitry. The processor and other circuitry can be supported by a package substrate. The substrate can include routing traces in a single metal layer (e.g., the M2 metal layer) by using self-aligned or ZMVs as well as a surface ground plane (e.g., M1 metal layer ground plane). The routing traces can alternate between signal traces and ground traces so that the density of the traces increases while also providing ground shielding against cross talk between signal traces.

The computing device 800 illustrated in FIG. 8 in accordance with one embodiment of the disclosure may include a number of components. In one embodiment, these components are attached to one or more motherboards. In an alternate embodiment, some or all of these components are fabricated onto a single system-on-a-chip (SoC) die. The components in the computing device 800 include, but are not limited to, an integrated circuit chip 802 and at least one communications logic unit 808. In some implementations, the communications logic unit 808 is fabricated within the integrated circuit chip 802 while in other implementations the communications logic unit 808 is fabricated in a separate integrated circuit chip that may be bonded to a substrate or motherboard that is shared with or electronically coupled to the integrated circuit chip 802. The integrated circuit chip 802 may include a CPU 804 as well as on-die memory 806, often used as cache memory, that can be provided by technologies such as embedded DRAM (eDRAM) or spin-transfer torque memory (STTM or STT-MRAM).

Computing device 800 may include other components that may or may not be physically and electrically coupled to the motherboard or fabricated within an SoC die. These other components include, but are not limited to, volatile memory 810 (e.g., DRAM), non-volatile memory 812 (e.g., ROM or flash memory), a GPU 814, a digital signal processor (DSP) 816, a crypto processor 842 (a specialized processor that executes cryptographic algorithms within hardware), a chipset 820, an antenna 822, a display (e.g., a touchscreen display) 824, a touchscreen controller 826, a battery 828 or other power source, a power amplifier (not shown), a voltage regulator (not shown), a global positioning system (GPS) device 830, a compass, a motion coprocessor or sensors 832 (that may include an accelerometer, a gyroscope, and a compass), a speaker 834, a camera 836, user input devices 838 (such as a keyboard, mouse, stylus, and touchpad), and a mass storage device 840 (such as hard disk drive, compact disc (CD), digital versatile disk (DVD), and so forth).

The communications logic unit 808 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications logic unit 808 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communications logic units 808. For instance, a first communications logic unit 808 may be dedicated to shorter range wireless communications such as Wi-Fi and Bluetooth and a second communications logic unit 808 may be dedicated to longer range wireless communications such as GPS, EDGE, GPRS, CDMA, WiMAX, LTE, Ev-DO, and others.

In various embodiments, the computing device 800 may be a laptop computer, a netbook computer, a notebook computer, an ultrabook computer, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

It is understood that the subject matter of the present description is not necessarily limited to specific applications illustrated in FIGS. 1-8. The subject matter may be applied to other microelectronic device and assembly applications, as well as any appropriate heat removal application, as will be understood to those skilled in the art.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims.

The following paragraphs provide examples of various ones of the embodiments disclosed herein.

Example 1 is a package substrate that includes a substrate including a first metal layer and a second metal layer; a ground plane residing on the first metal layer; a first signal trace residing in the second metal layer, the first signal trace electrically coupled to a first signal pad residing in the first metal layer by a first signal via, the first signal via including a width substantially similar to a width of the first signal trace; a second signal trace residing in the second metal layer, the second signal trace electrically coupled to a second signal pad residing in the first metal layer by a second signal via, the second signal via including a width substantially similar to a width of the second signal trace; and a ground trace residing in the second metal layer between the first signal trace and the second signal trace, the ground trace electrically coupled to the ground plane by a ground via, the ground via including a width substantially similar to a width of the ground trace.

Example 2 may include the subject matter of example 1, wherein the ground trace is a first ground trace electrically coupled to the ground plane by a first ground via, the package substrate further including a second ground trace residing in the second metal layer, the second ground trace electrically coupled to the ground plane by a second ground via, the second ground via including a width substantially similar to a width of the second ground trace; wherein the first signal trace resides between the first ground trace and the second ground trace.

Example 3 may include the subject matter of example 2, wherein the first ground trace is electrically connected the second ground trace by the ground plane.

Example 4 may include the subject matter of example 3, wherein the ground plane includes a patterned metal line electrically coupled to the first ground via and the second ground via.

Example 5 may include the subject matter of example 3, wherein the ground plane includes a ground plane on the first metal layer spanning an area of the first metal layer that covers the first signal trace.

Example 6 may include the subject matter of example 5, package substrate includes two signal traces in the second metal layer, the two signal traces defining a differential pair of signal traces; and wherein the ground plane includes a gap in a region of the first metal layer above the differential pair of signal traces.

Example 7 may include the subject matter of any of examples 1-6, wherein the ground plane is a first ground plane, the package substrate further including a third metal layer, the third metal layer including a second ground plane, the second metal layer between the first metal layer and the third metal layer, the second ground plane electrically connected to the ground trace by the first ground plane in the first metal layer.

Example 8 may include the subject matter of any of examples 1-7, wherein the first ground plane is electrically coupled to the first ground plane by a via traversing the second metal layer.

Example 9 may include the subject matter of any of examples 1-8, wherein the ground via includes one of a self-aligned via or a zero-misaligned via.

Example 10 may include the subject matter of any of examples 1-9, wherein the first signal via and the second signal via include one of a self-aligned via or a zero-misaligned via.

Example 11 may include the subject matter of any of examples 1-10, wherein the package substrate includes a plurality of signal traces in the second metal layer and a plurality of ground traces in the second metal layer, and wherein a number of signal traces is equal to a number of ground traces.

Example 12 may include the subject matter of any of examples 1-11, wherein the ground plane includes a thickness between 10-15 μm thick.

Example 13 may include the subject matter of any of examples 1-12, wherein the ground plane includes a thickness below 6 μm.

Example 14 may include the subject matter of any of examples 1-13, wherein the ground plane includes copper.

Example 15 may include the subject matter of any of examples 1-14, and can also include a signal solder bump electrically coupled to the first signal pad; a ground pad on the first metal layer, the ground pad electrically coupled to the ground plane; and a ground solder bump electrically coupled to the ground pad.

Example 16 may include the subject matter of example 15, wherein the first signal pad is a first level interconnect (FLI).

Example 17 may include the subject matter of example 16, wherein the FLI includes copper of a thickness between 1.4 μm and 1.6 μm.

Example 18 may include the subject matter of any of examples 1-17, wherein the first signal trace and the second signal trace are high speed input/output traces.

Example 19 may include the subject matter of any of examples 1-18, wherein the package substrate includes a die edge, and wherein the ground plane includes a surface metal on the first metal layer extending to the die edge.

Example 20 is a method of forming a package substrate that includes forming a substrate ground plane in a third metal layer of a substrate; forming a plurality of traces including a predetermined trace width in a second metal layer of the substrate, forming a signal via on a first subset of traces of the plurality of traces, wherein forming the signal via includes forming the signal via to a width of substantially similar width as the predetermined trace width, and wherein the first subset of traces includes alternating traces; forming a ground via on a second subset of traces of the plurality of traces, the second subset different from the first subset of traces, wherein forming the ground via includes forming the ground via to a width of substantially similar width as the predetermined trace width, and wherein the second subset of traces includes alternating traces; and forming a surface ground plane on a first metal layer, the surface ground plane on the first metal layer electrically connected to at least one ground trace by the ground via.

Example 21 may include the subject matter of example 20, and can also include forming a signal pad on the first metal layer, the signal pad electrically connected to at least one signal trace by the signal via.

Example 22 may include the subject matter of any of examples 20-21, further including forming a substrate ground via in the second metal layer, the substrate ground via electrically connected to the substrate ground plane and to the surface ground plane.

Example 23 may include the subject matter of any of examples 20-22, wherein forming the surface ground plane includes an additive processing to form a patterned metal layer on the first metal layer of the package substrate.

Example 24 may include the subject matter of example 23, wherein the additive processing includes one or more of cold spray, inkjet printing, stencil printing of a conductive paste, laser assisted selective electroless plating.

Example 25 is a computing device that includes a processor mounted on a substrate; a communications logic unit within the processor; and a memory within the processor. The substrate can include a first metal layer and a second metal layer; a ground plane residing on the first metal layer; a first signal trace residing in the second metal layer, the first signal trace electrically coupled to a first signal pad residing in the first metal layer by a first signal via, the first signal via including a width substantially similar to a width of the first signal trace; a second signal trace residing in the second metal layer, the second signal trace electrically coupled to a second signal pad residing in the first metal layer by a second signal via, the second signal via including a width substantially similar to a width of the second signal trace; and a ground trace residing in the second metal layer between the first signal trace and the second signal trace, the ground trace electrically coupled to the ground plane by a ground via, the ground via including a width substantially similar to a width of the ground trace.

Example 26 may include the subject matter of example 25, wherein the ground trace is a first ground trace and the ground via is a first ground via. The substrate can include a second ground trace residing in the second metal layer, the first signal trace between the first ground trace and the second ground trace, the second ground trace comprising electrically coupled to the ground plane by a second ground via, the second ground via comprising a width substantially similar to a width of the second ground trace; and a third ground trace residing in the second metal layer, the second signal trace between the first ground trace and the third ground trace, the third ground trace comprising electrically coupled to the ground plane by a third ground via, the third ground via comprising a width substantially similar to a width of the third ground trace.

What is claimed is:

1. A package substrate comprising:
   a first metal layer and a second metal layer;
   a ground plane in the first metal layer;
   a first signal trace in the second metal layer, the first signal trace electrically coupled to
   a first signal pad in the first metal layer by a first signal via;
   a second signal trace in the second metal layer, the second signal trace electrically coupled to a second signal pad in the first metal layer by a second signal via;
   a first ground trace in the second metal layer between the first signal trace and the second signal trace, the first ground trace electrically coupled to the ground plane by a first ground via; and
   a second ground trace in the second metal layer, the second ground trace electrically coupled to the ground plane by a second ground via, and the second ground via having a width substantially similar to a width of the second ground trace;
   wherein the first signal trace is between the first ground trace and the second ground trace.

2. The package substrate of claim 1, wherein the first ground trace is electrically connected to the second ground trace by the ground plane.

3. The package substrate of claim 2, wherein the ground plane comprises a patterned metal line electrically coupled to the first ground via and the second ground via.

4. The package substrate of claim 2, wherein the ground plane comprises a ground plane on the first metal layer spanning an area of the first metal layer that covers the first signal trace.

5. The package substrate of claim 4, wherein the package substrate comprises two adjacent signal traces in the second metal layer, the two adjacent signal traces defining a differential pair of signal traces; and
   wherein the ground plane comprises a gap in a region of the first metal layer above the two adjacent signal traces defining the differential pair of signal traces.

6. The package substrate of claim 1, wherein the ground plane is a first ground plane, the package substrate further comprises a third metal layer, the third metal layer comprises a second ground plane, the second metal layer between the first metal layer and the third metal layer, and the second ground plane is electrically connected to the ground trace by the first ground plane in the first metal layer.

7. The package substrate of claim 6, wherein the second ground plane is electrically coupled to the first ground plane by a via traversing the second metal layer.

8. The package substrate of claim 1, wherein the ground via comprises one of a self-aligned via or a zero-misaligned via.

9. The package substrate of claim 1, wherein the first signal via and the second signal via comprise one of a self-aligned via or a zero-misaligned via.

10. The package substrate of claim 1, wherein the package substrate comprises a plurality of signal traces in the second metal layer and a plurality of ground traces in the second metal layer, and wherein a number of signal traces is equal to a number of ground traces.

11. The package substrate of claim 1, wherein the ground plane has a thickness between 10 μm and 15 μm.

12. The package substrate of claim 1, wherein the ground plane has a thickness below 6 µm.

13. The package substrate of claim 1, wherein the ground plane comprises copper.

14. The package substrate of claim 1, further comprising:
   a signal solder bump electrically coupled to the first signal pad;
   a ground pad on the first metal layer, the ground pad electrically coupled to the ground plane; and
   a ground solder bump electrically coupled to the ground pad.

15. The package substrate of claim 14, wherein the first signal pad is a first level interconnect (FLI).

16. The package substrate of claim 15, wherein the FLI comprises copper of a thickness between 1.4 µm and 1.6 µm.

17. The package substrate of claim 1, wherein the first signal trace and the second signal trace are high speed input/output traces.

18. The package substrate of claim 1, wherein the package substrate comprises a die edge, and wherein the ground plane comprises a surface metal on the first metal layer extending to the die edge.

19. A computing device comprising:
   a processor mounted on a substrate;
   wherein the substrate comprises:
      a first metal layer and a second metal layer;
      a ground plane in the first metal layer;
      a first signal trace in the second metal layer, the first signal trace electrically coupled to a first signal pad in the first metal layer by a first signal via;
      a second signal trace in the second metal layer, the second signal trace electrically coupled to a second signal pad in the first metal layer by a second signal via; and
      a first ground trace in the second metal layer between the first signal trace and the second signal trace, the first ground trace electrically coupled to the ground plane by a first ground via;
      a second ground trace in the second metal layer, the first signal trace between the first ground trace and the second ground trace, the second ground trace electrically coupled to the ground plane by a second ground via; and
      a third ground trace in the second metal layer, the second signal trace between the first ground trace and the third ground trace, the third ground trace electrically coupled to the ground plane by a third ground via.

20. The package substrate of claim 1, wherein the first signal via has a width substantially similar to a width of the first signal trace.

21. A package substrate comprising:
   a first metal layer and a second metal layer;
   a ground plane in the first metal layer;
   a first signal trace in the second metal layer, the first signal trace electrically coupled to
   a first signal pad in the first metal layer by a first signal via, and the first signal via having a width substantially equal to a width of the first signal trace;
   a second signal trace in the second metal layer, the second signal trace electrically coupled to a second signal pad in the first metal layer by a second signal via, and the second signal via has a width substantially equal to a width of the second signal trace; and
   a ground trace in the second metal layer between the first signal trace and the second signal trace, the ground trace electrically coupled to the ground plane by a ground via.

22. The package substrate of claim 21, wherein the ground plane is a first ground plane, the package substrate further comprises a third metal layer, the third metal layer comprises a second ground plane, the second metal layer between the first metal layer and the third metal layer, and the second ground plane is electrically connected to the ground trace by the first ground plane in the first metal layer.

23. The package substrate of claim 22, wherein the second ground plane is electrically coupled to the first ground plane by a via traversing the second metal layer.

24. The package substrate of claim 21, wherein the ground via has a width substantially equal to a width of the ground trace.

* * * * *